(12) United States Patent
Chen

(10) Patent No.: US 7,406,903 B2
(45) Date of Patent: Aug. 5, 2008

(54) SAWING MACHINE

(75) Inventor: Jung-Huo Chen, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 470 days.

(21) Appl. No.: 11/034,835

(22) Filed: Jan. 14, 2005

(65) Prior Publication Data

US 2006/0016313 A1   Jan. 26, 2006

(30) Foreign Application Priority Data

Jul. 21, 2004   (TW) ............................ 93211541 U

(51) Int. Cl.
*B26D 7/27*   (2006.01)
*B27B 19/00*   (2006.01)

(52) U.S. Cl. .............. 83/522.16; 83/522.15; 83/522.17; 83/746; 83/783

(58) Field of Classification Search .................... 83/473, 83/490, 471.3, 522.11–522.29, 746, 783; 33/534–538; D15/133

See application file for complete search history.

(56) References Cited

U.S. PATENT DOCUMENTS

| | | | |
|---|---|---|---|
| 680,089 A * | 8/1901 | Untiedt | 83/473 |
| 4,625,609 A * | 12/1986 | Ashworth | 83/748 |
| 5,540,130 A | 7/1996 | Huang et al. | |
| 5,778,752 A * | 7/1998 | Chen | 83/783 |
| 5,875,698 A * | 3/1999 | Ceroll et al. | 83/473 |
| D444,801 S * | 7/2001 | Welsh | D15/133 |
| 6,595,096 B2 * | 7/2003 | Ceroll et al. | 83/473 |
| 6,729,221 B2 * | 5/2004 | Liao et al. | 83/781 |
| 6,860,183 B1 * | 3/2005 | Chen | 83/473 |
| 7,121,179 B2 * | 10/2006 | Chen | 83/522.17 |
| 2003/0213353 A1 | 11/2003 | Liao et al. | |
| 2005/0000338 A1 | 1/2005 | Wascow | |
| 2005/0199112 A1 * | 9/2005 | Ku et al. | 83/473 |
| 2005/0268766 A1 * | 12/2005 | Chen | 83/473 |
| 2006/0278055 A1 * | 12/2006 | Vorwerk | 83/473 |

FOREIGN PATENT DOCUMENTS

EP   0 642 897 A   3/1995

* cited by examiner

*Primary Examiner*—Jason Prone
(74) *Attorney, Agent, or Firm*—Bacon & Thomas, PLLC

(57) ABSTRACT

A sawing machine includes a base, a worktable tiltable relative to the base, a tilt control mechanism coupled between the base and the worktable for tilting the worktable relative to the base, and a tilt angle indicator for indicating a tilt angle of the worktable. The tilt angle indicator includes a wheel, which is pivoted to a bottom side of the worktable and has an indication zone, a spring member provided between the wheel and the worktable for providing a torsional force to the wheel, and a pull cord connected between the base and the wheel for driving the wheel to rotate when tilting the worktable relative to the base.

11 Claims, 8 Drawing Sheets

SAWING MACHINE

BACKGROUND OF THE INVENTION

1. Field of the Invention

The present invention relates generally to a sawing machine, such as a scroll saw, band saw and the like, and more particularly, to such a sawing machine that is provided with a tilt angle indicator.

2. Description of the Related Art

FIG. 8 shows a scroll saw 70 according to the prior art. According to this design, the scroll saw 70 comprises a bottom seat 71, an arched suspension arm 72 formed of an upper arm member 721 and a lower arm member 722 arranged in parallel, a worktable 73 pivoted to the lower arm member 722, and a scroll saw blade 74 connected between the free end of the upper arm member 721 and the free end of the lower arm member 722 and extended through the worktable 73. The worktable 73 has an arched opening 731 at the bottom side on the middle, a series of teeth 732 arranged along one side of the arched opening 731, and a scale 733 connected to the bottom wall. A rotary knob 75 is rotatably located in the arched opening 731, having a gear (not shown) meshed with the teeth 732. Rotating the rotary knob 75 causes the worktable 73 to tilt relative to the bottom seat 71. Further, the scale 733 has angle-measurement graduations 734. By means of the indication of the angle-measurement graduations 734, the operator can accurately adjust the tilt angle of the worktable 73.

By means of the rotary knob 75 and the indication of the angle-measurement graduations 734 of the scale 733, the operator can conveniently and accurately adjust the tilt angle of the worktable 73. However, because the scale 733 is provided at the bottom side of the worktable 73, the operator cannot see the indication of the angle-measurement graduations 734 of the scale 733 from the top side of the worktable 73. When adjusting the tilt angle of the worktable 73, the operator may have to bend the body in order to see the indication of the angle-measurement graduations 734 of the scale 733. Further, when tilting the worktable 73 over a predetermined angle, the rear end edge of the worktable 73 may block the indication of the angle-measurement graduations 734 of the scale 733.

SUMMARY OF THE INVENTION

The present invention has been accomplished under the circumstances in view. It is the primary objective of the present invention to provide a sawing machine, such as a scroll saw, band saw and the like, which enables the operator to directly see the tilt angle of the worktable from the top side of the worktable during adjustment of the worktable, thereby shortening the preparation operation before cutting.

To achieve this objective of the present invention, the sawing machine provided by the present invention comprises a base, a worktable tiltable relative to the base, a tilt control mechanism coupled between the base and the worktable for tilting the worktable relative to the base, and a tilt angle indicator for indicating a tilt angle of the worktable. The tilt angle indicator comprises a wheel, which is pivoted to a bottom side of the worktable and has an indication zone, a spring member provided between the wheel and the worktable for providing a torsional force to the wheel, and a pull cord connected between the base and the wheel for driving the wheel to rotate when tilting the worktable relative to the base.

In an embodiment of the present invention, the sawing machine is a scroll saw. In another embodiment of the present invention, the sawing machine is a band saw.

Preferably, the worktable is provided with a through hole through which the indication zone of the wheel is visible. In addition, the worktable is preferably provided with a downwardly extended shaft to which the wheel is pivoted. In an embodiment of the present invention, the worktable is provided with a guider for guiding movement of the pull cord.

DETAILED DESCRIPTION OF THE INVENTION

Figure 1:
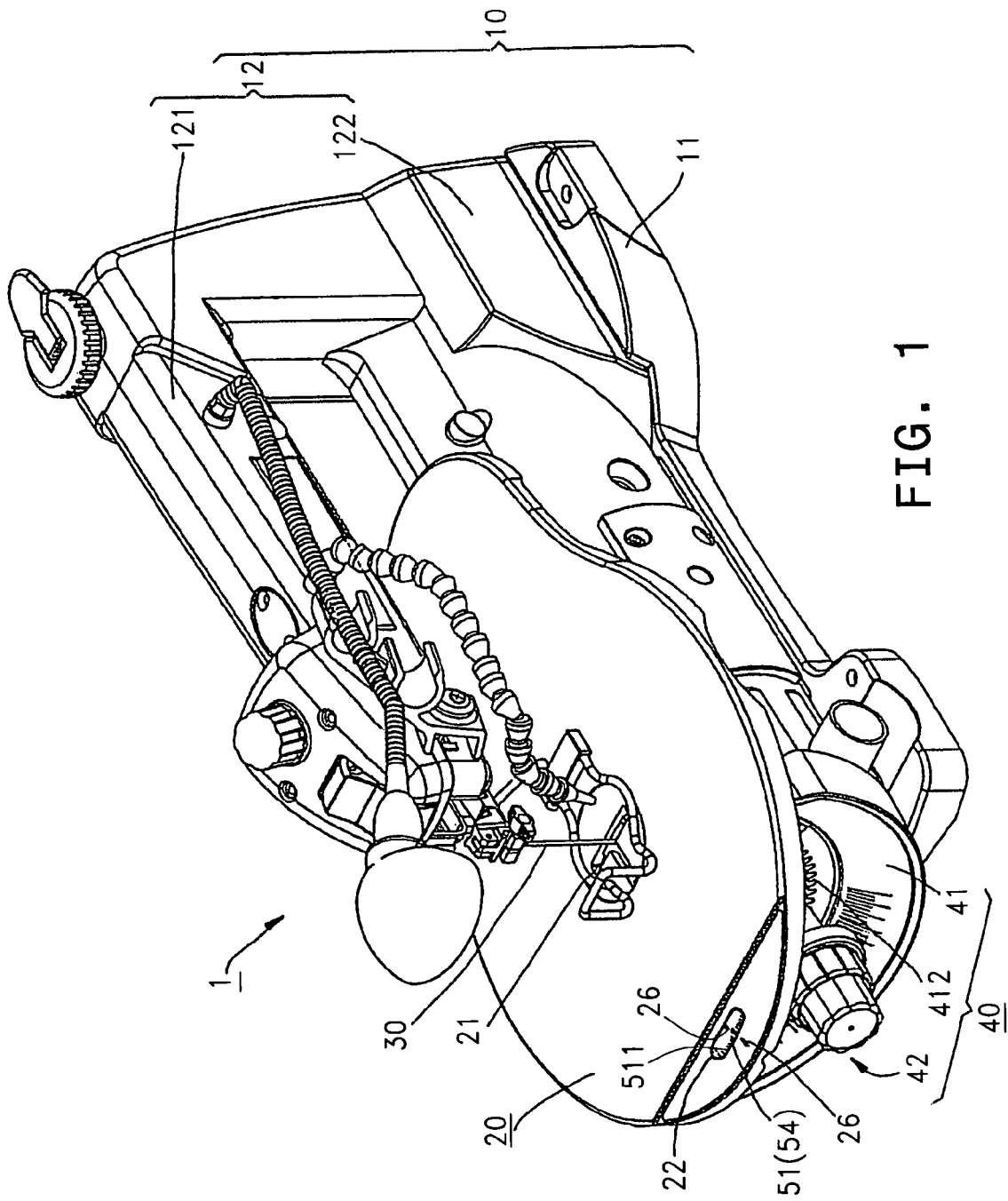
FIG. 1 is a perspective view of a first preferred embodiment according to the present invention.
Figure 2:
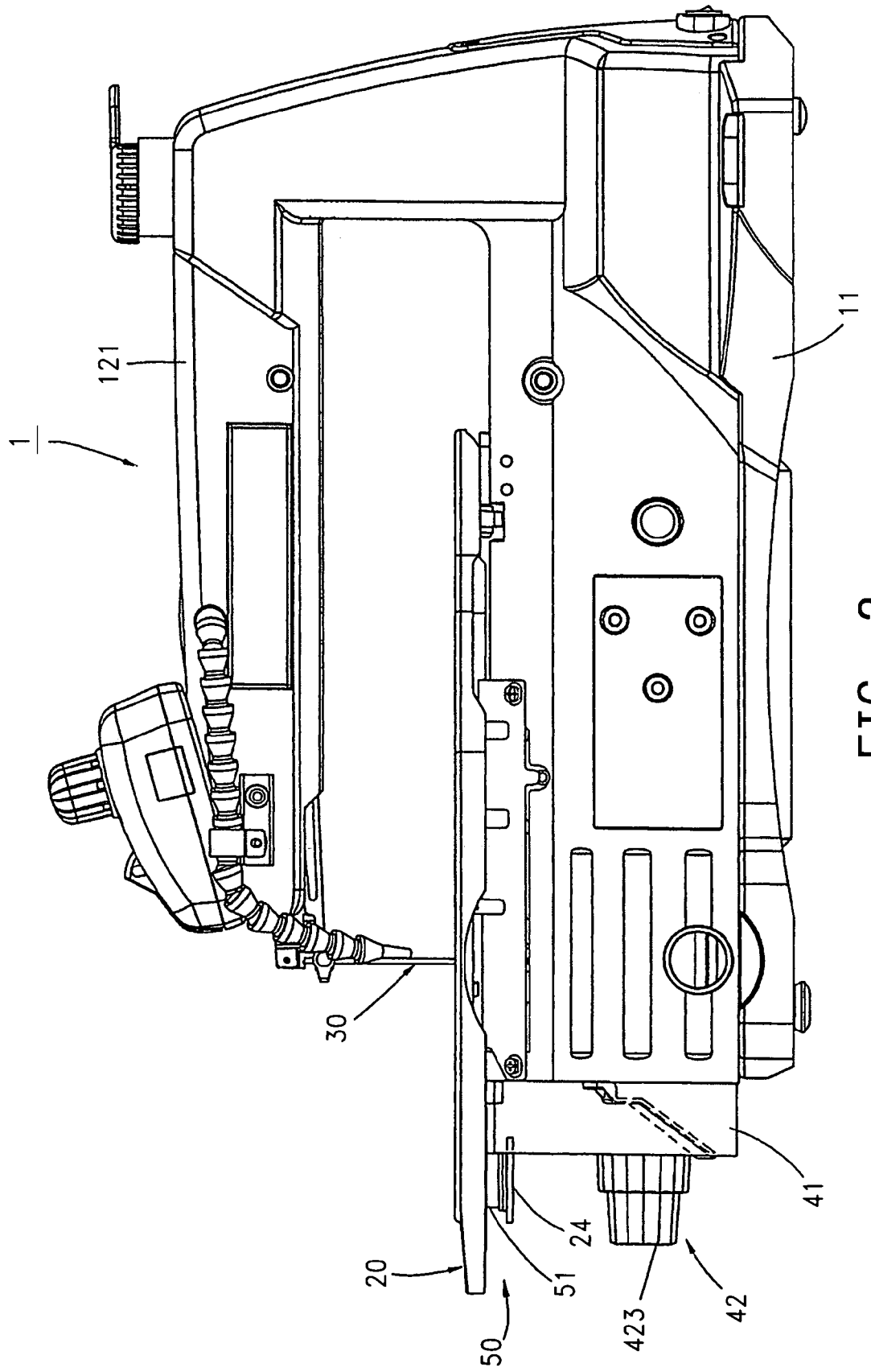
FIG. 2 is a right side view of the first preferred embodiment according to the present invention.

Referring to FIGS. 1 and 2, a sawing machine embodied as a scroll saw 1 in accordance with the first preferred embodiment of the present invention is shown comprised of a base 10, a worktable 20, a tilt control mechanism 40, and a tilt angle indicator 50.

The base 10 comprises a bottom seat 11 and an arched suspension arm 12 at the top side of the bottom seat 11. The suspension arm 12 is comprised of an upper arm member 121 and a lower arm member 122 arrangement in parallel.

The worktable 20 is pivoted to the lower arm member 122, having a slot 21 extended through the top and bottom sides thereof on the middle for the passing of a scroll saw blade 30, and a through hole 22 near the front side. The top side of the worktable 20 is a flat surface for supporting the workpiece to be cut.

Figure 3:
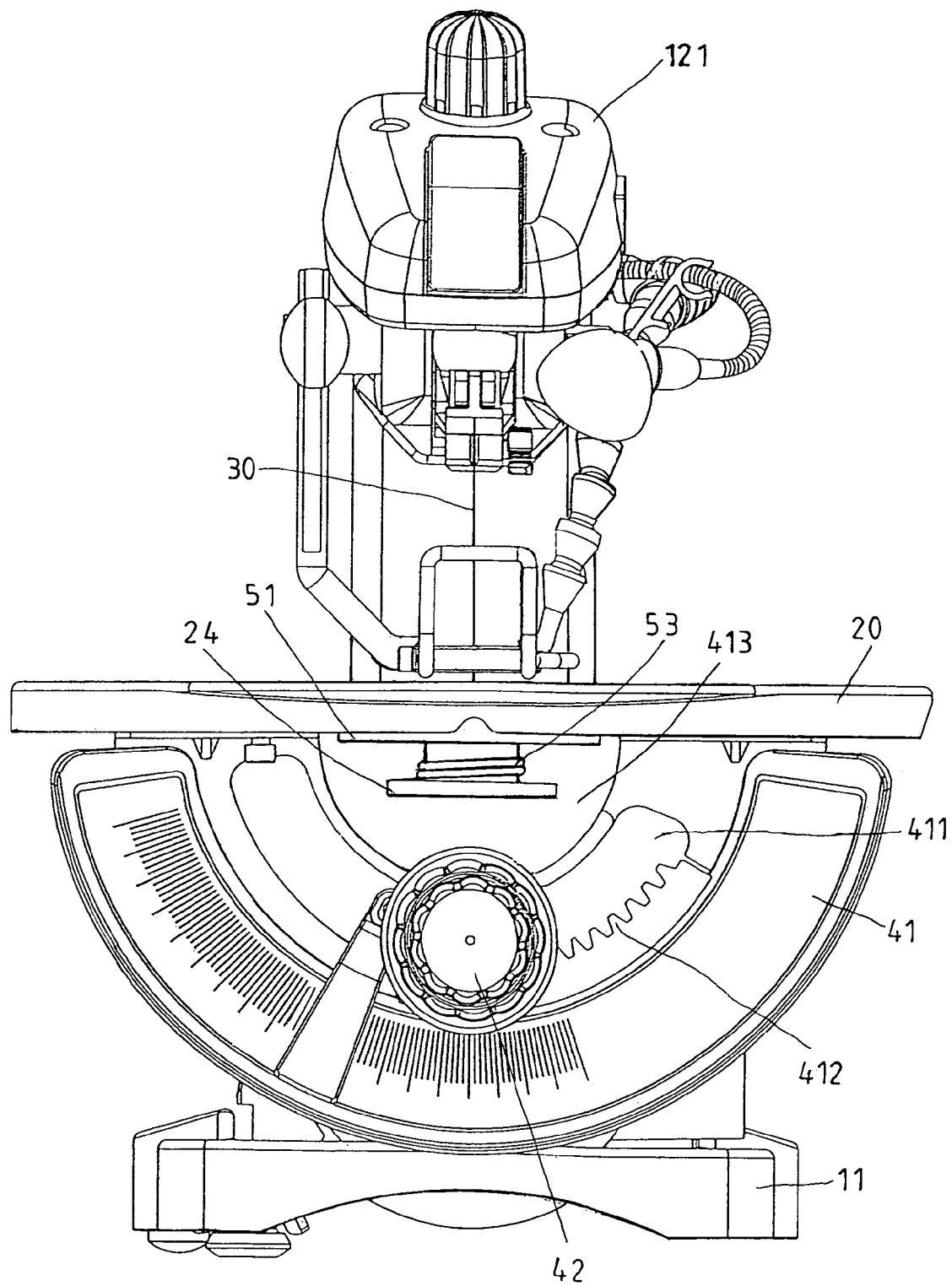
FIG. 3 is a front view of the first preferred embodiment according to the present invention.
Figure 4:
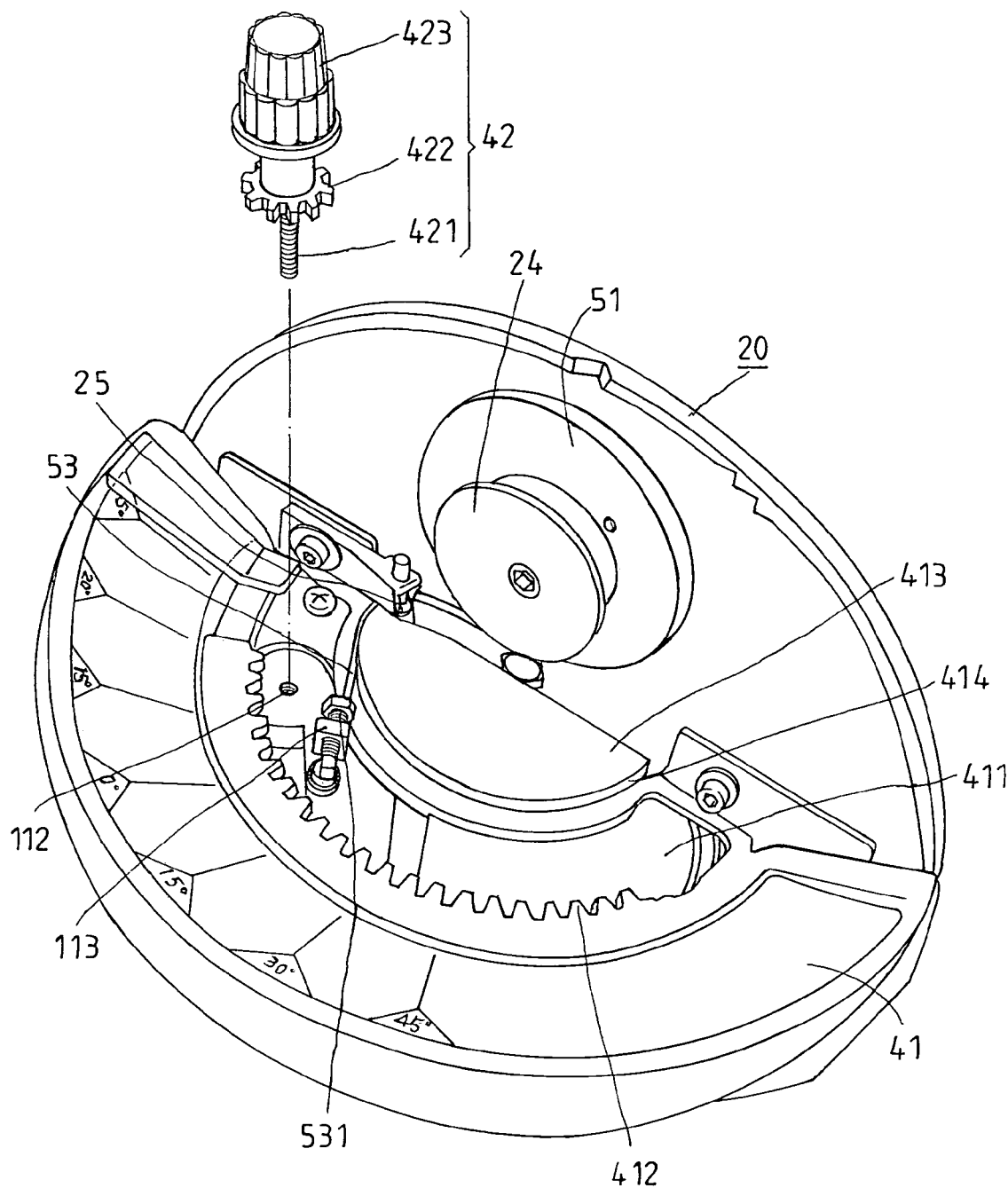
FIG. 4 is an exploded view in an enlarged scale of a part of FIG. 1, showing the structure of the tilt angle indicator.

The tilt control mechanism 40 comprises a mounting plate 41 fixedly provided at the bottom side of the worktable 20 (see also FIGS. 3 and 4), and a rotary knob 42 inserted through the mounting plate 41 and pivoted to the lower arm member 122 of the base 10. The mounting plate 41 has an arched center opening 411, a series of teeth 412 arranged along the arched bottom side of the arched center opening 411, a semicircular stop flange 413 spaced along the arched top side of the arched center opening 411, and a groove 414 extended along the periphery of the semicircular stop flange 413. The rotary knob 42 has a screw rod 421 disposed at one end and threaded into a screw hole 112 in the lower arm member 122, a gear 422 disposed on the middle and meshed with the teeth 412 of the mounting plate 41, and a head 423 disposed at the other end for turning by hand to adjust and position the tilt angle of the worktable 20 relative to the suspension arms 12.

Figure 5:
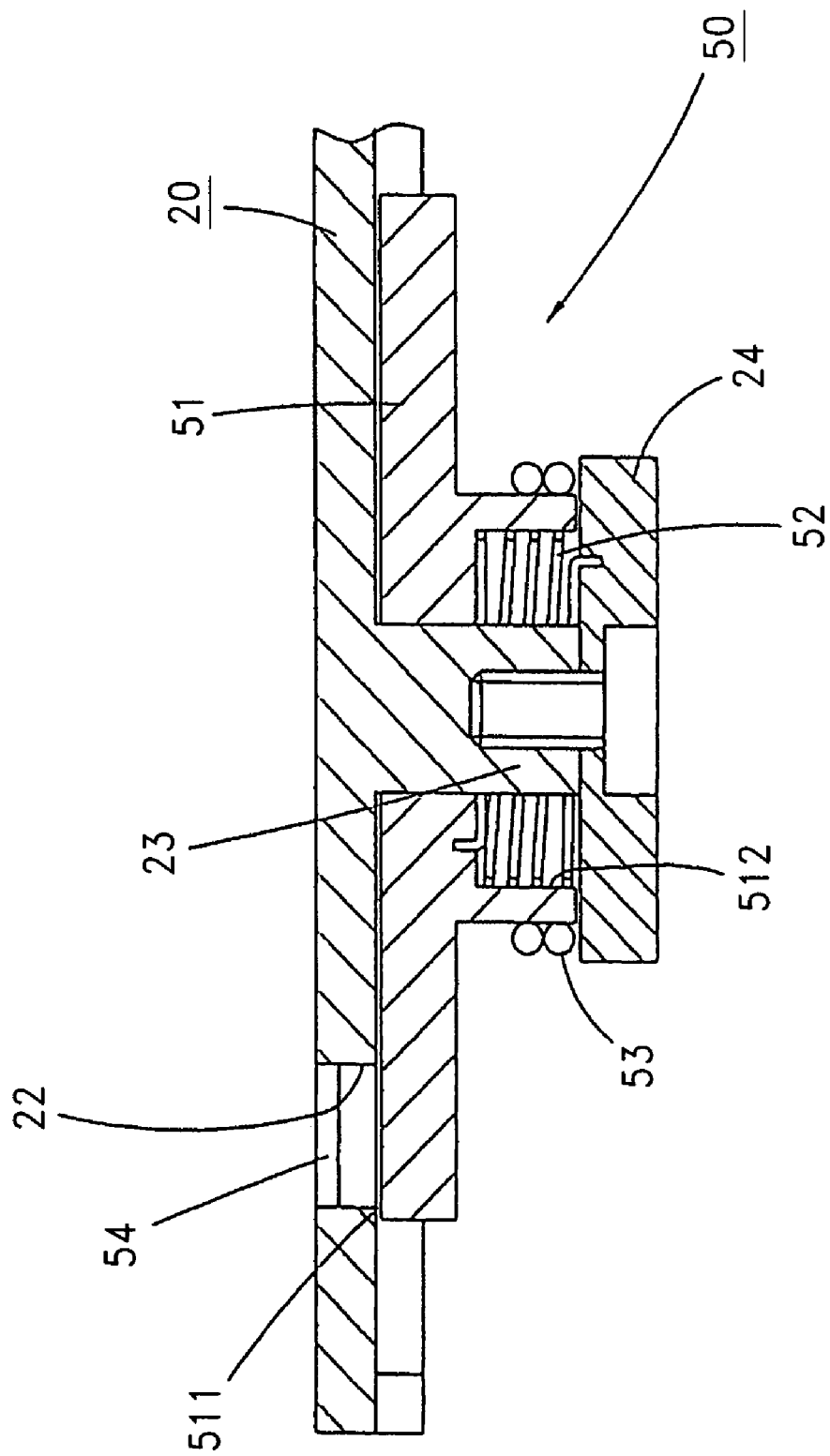
FIG. 5 is a sectional view in an enlarged scale of a part of FIG. 4 showing the structure of the wheel of the tilt angle indicator.
Figure 6:
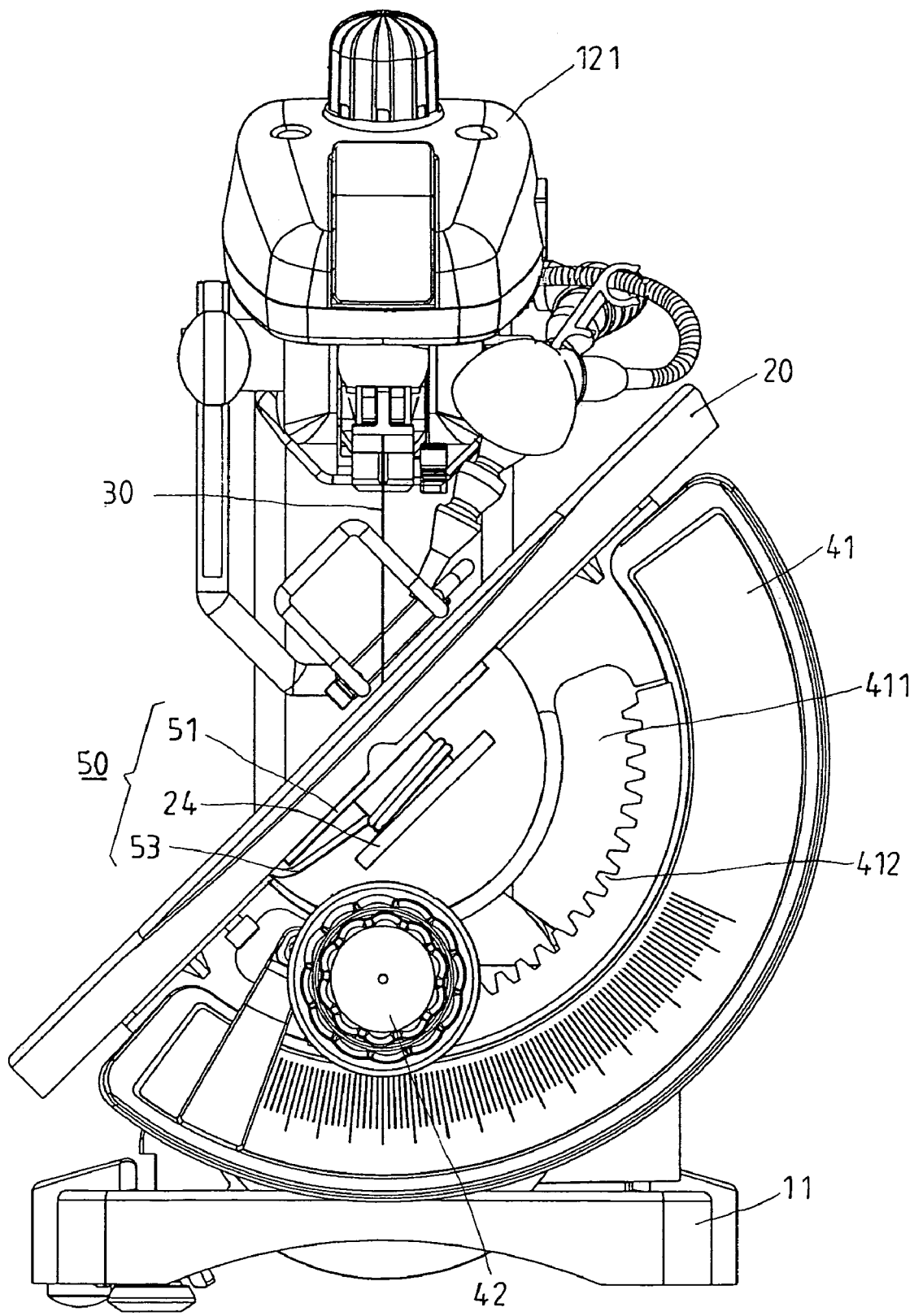
FIG. 6 is similar to FIG. 3 but showing the worktable tilted.

Referring to FIG. 5, the tilt angle indicator 50 comprises a wheel 51 provided at the bottom side of the worktable 20, a spring member 52 supported between the worktable 20 and the wheel 51, and a pull cord 53 coupled between the front side of the lower arm member 122 and the wheel 51. The wheel 51 is pivotally coupled to a shaft 23 at the bottom side of the worktable 20. A cap 24 is fastened to the free end of the shaft 23 to stop the wheel 51 from falling out of the shaft 23.

The wheel 51 has an indication zone 511 marked with graduations in one side thereof below the through hole 22 of the worktable 20. The through hole 22 is covered with a transparent covering 54 through which the operator sees the indication of the marked area 511. The spring member 52 is received in a recessed hole 512 around the center of the wheel 51, having two opposite ends respectively fastened to the wheel 51 and the cap 24 for producing a reversed torsional force upon rotation of the wheel 51 on the shaft 23.

The pull cord 53 (which is a steel rope member according to the present preferred embodiment) has one end connected to the wheel 51 and the other end fastened to a locating portion 113 of the lower arm member 122 of the base 10. When tilting the worktable 20, the pull cord 53 is driven to turn the wheel 51 about the shaft 23 synchronously. Further, the worktable 20 has a downwardly protruded and smoothly arched bottom guider 25 for guiding movement of the pull cord 53. In addition, the middle portion of the pull cord 53 is located in the groove 414 of the stop flange 413 of the mounting plate 41, thereby preventing the pull cord 53 from escaping from the stop flange 413 when the pull cord 53 moves.

Therefore, when the operator adjusting the tilt angle of the worktable 20, the wheel 51 is driven by the pull cord 53 to turn about the shaft 23, and at the same time the operator can see the indication of the graduations of the indication zone 511 of the wheel 51 through the through hole 22, assuring accurate tilt angle adjustment.

Further, the guider 25 can be a pulley or bearing so as to lower friction resistance during movement of the pull cord 53, thereby smoothening tilting of the worktable 20 and rotation of the wheel 51.

Further, an angle-indicating pointer 26 is marked on the top surface of the worktable 20 and extended from the periphery of the through hole 22 for indicating the tilt angle of the worktable 20. Alternatively, the angle-indicating pointer 26 may be directly marked on the covering 54 to provide the same effect.

Further, an adjustment screw 531 is provided to adjustably secure one end of the pull cord 53 to the locating portion 113 of the lower arm member 122 of the base 10. Rotating the adjustment screw 531 relatively adjusts the tension of the pull cord 53 and the angle of gyration of the wheel 51. During adjustment, the angle-indicating pointer 26 serves as a reference line for calibration.

Figure 7:
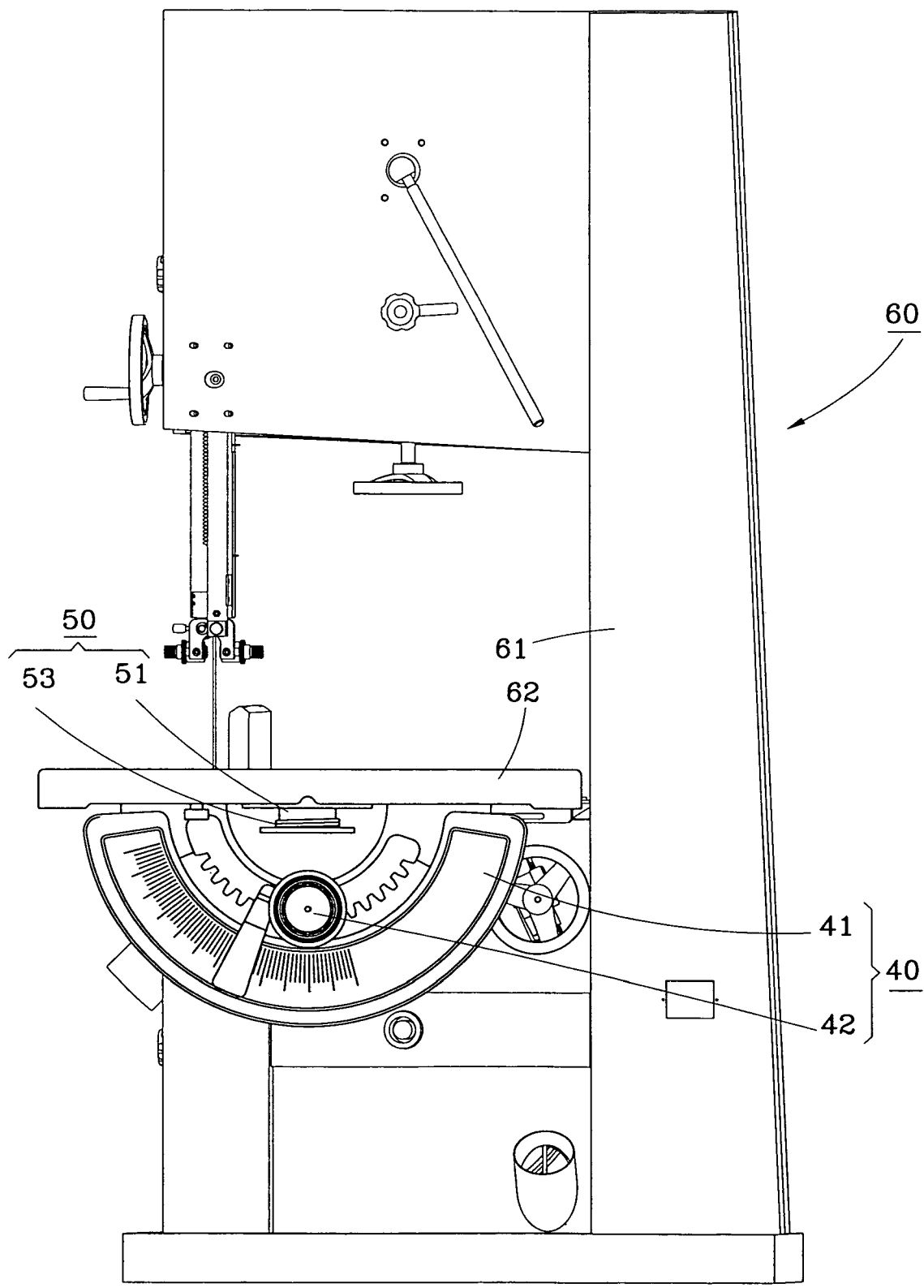
FIG. 7 is a front view of a second preferred embodiment according to the present invention.
Figure 8:
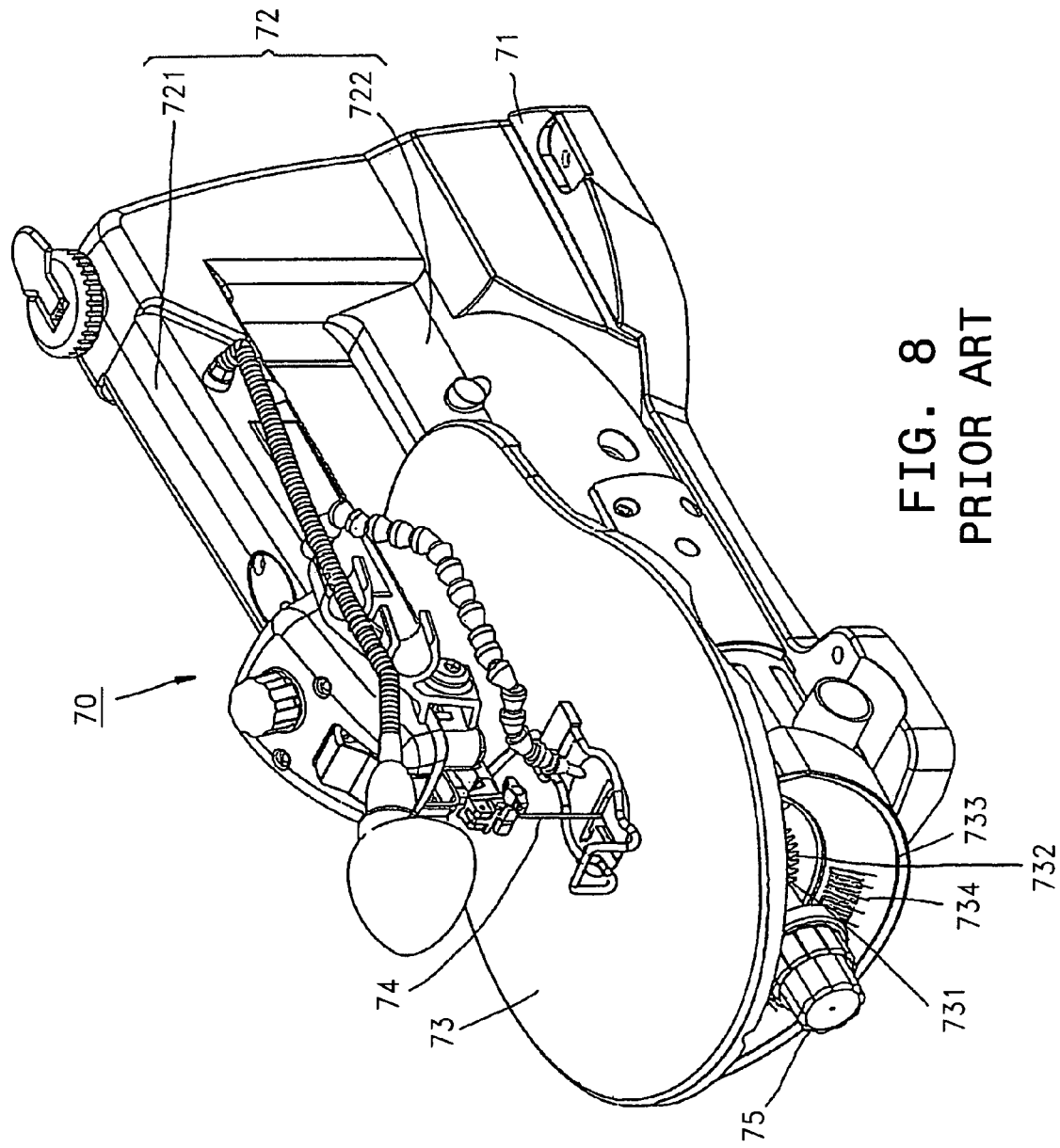
FIG. 8 is a perspective view of a scroll saw according to the prior art.

As shown in FIG. 7, a sawing machine embodied as a band saw 60 in accordance with the second preferred embodiment of the present invention comprises a bottom seat 61, a worktable 62 tiltable relative to the bottom seat 61, a tilt control mechanism 40 for driving the worktable 62 to tilt, and a tilt angle indicator 50 for indicating of the tilting angle of the worktable. The constructions of the tilt control mechanism 40 and the tilt angle indicator 50 are the same with the ones disclosed in the aforesaid first preferred embodiment, therefore, no detailed description thereof is necessary.

As indicated above, the sawing machine of the present invention has the following features:

1. The tilt angle indicator of the sawing machine synchronously indicates the tilt angle of the worktable during adjustment, and the operator without obstruction can clearly see the indication of the tilt angle indicator.

2. The wheel of the angle tilt angle indicator can selectively be installed in a different position subject to the model of the sawing machine.

3. The tilt angle indicator of the sawing machine has a simple structure and is inexpensive to manufacture, and can effectively improve the efficiency of the cutting operation.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A sawing machine comprising:
    a base;
    a worktable tiltable relative to said base;
    a tilt control mechanism coupled between said base and said worktable for tilting said worktable relative to said base, and
    a tilt angle indicator for indicating a tilt angle of said worktable, wherein said tilt angle indicator comprises:
        a wheel pivoted to a bottom side of said worktable, said wheel having an indication zone;
        a spring member provided between said wheel and said worktable for providing a torsional force to said wheel; and
        a pull cord connected between said base and said wheel for driving said wheel to rotate when tilting said worktable relative to said base.

2. The sawing machine as claimed in claim 1, wherein said worktable has a through hole through which the indication zone of said wheel is visible.

3. The sawing machine as claimed in claim 2, wherein said worktable has an angle-indicating pointer marked on a top surface thereof adjacent to said through hole.

4. The sawing machine as claimed in claim 2, wherein said through hole is covered with a transparent covering.

5. The sawing machine as claimed in claim 4, wherein said transparent covering has a middle part marked with an angle-indicating pointer.

6. The sawing machine as claimed in claim 1, wherein said worktable has a downwardly extended shaft to which said wheel is pivoted.

7. The sawing machine as claimed in claim 6, wherein said shaft has a distal end fixedly mounted with a cap.

8. The sawing machine as claimed in claim 1, wherein said wheel has a recessed portion at a center of one side thereof for accommodating said spring member.

9. The sawing machine as claimed in claim 1, wherein said worktable further comprises a guider for guiding movement of said pull cord.

10. The sawing machine as claimed in claim 9, wherein said guider is a pulley.

11. The sawing machine as claimed in claim 1, wherein said indication zone of said wheel is marked with graduations.

* * * * *